United States Patent [19]

Redlin

[11] 4,076,007
[45] Feb. 28, 1978

[54] GEMSTONE DRILL

[76] Inventor: Eugene E. Redlin, 10764 Freer St., Temple City, Calif. 91780

[21] Appl. No.: 671,056

[22] Filed: Mar. 29, 1976

[51] Int. Cl.² .............................................. B28D 5/00
[52] U.S. Cl. .................... 125/30 R; 408/15; 408/127
[58] Field of Search .................. 408/15, 127, 124; 51/216 R, 59 R, 59 SS; 125/30 R, 30 WD

[56] References Cited

U.S. PATENT DOCUMENTS

| | | | |
|---|---|---|---|
| 1,722,992 | 8/1929 | Bertrand | 408/127 |
| 2,398,250 | 4/1946 | Robbins | 125/30 WD |
| 2,402,831 | 6/1946 | Moses | 125/30 WD |
| 2,474,800 | 6/1949 | Nill | 51/216 R UX |
| 2,622,581 | 12/1952 | Peters | 125/30 WD |
| 2,792,883 | 5/1957 | Pokorski | 408/15 X |
| 2,906,144 | 9/1959 | McManis | 408/124 |
| 2,942,383 | 6/1960 | Brown | 51/59 SS |
| 3,350,817 | 11/1967 | Kiso | 51/165.74 |
| 3,447,528 | 6/1969 | Annen | 125/30 R |

Primary Examiner—Harold D. Whitehead
Attorney, Agent, or Firm—William H. Maxwell

[57] ABSTRACT

A depressed drill assembly and vibratory work piece support for abrasive cutting in a zone immersed in liquid with or without abrasive grit, wherein vertically disposed excursions aligned with the gravitational axis of the drill assembly intermittently lifts the latter for access and entry of said grit and/or liquid into the cutting zone intermediate the drill and work piece, whereby holes are accurately cut through gemstones and the like.

5 Claims, 4 Drawing Figures

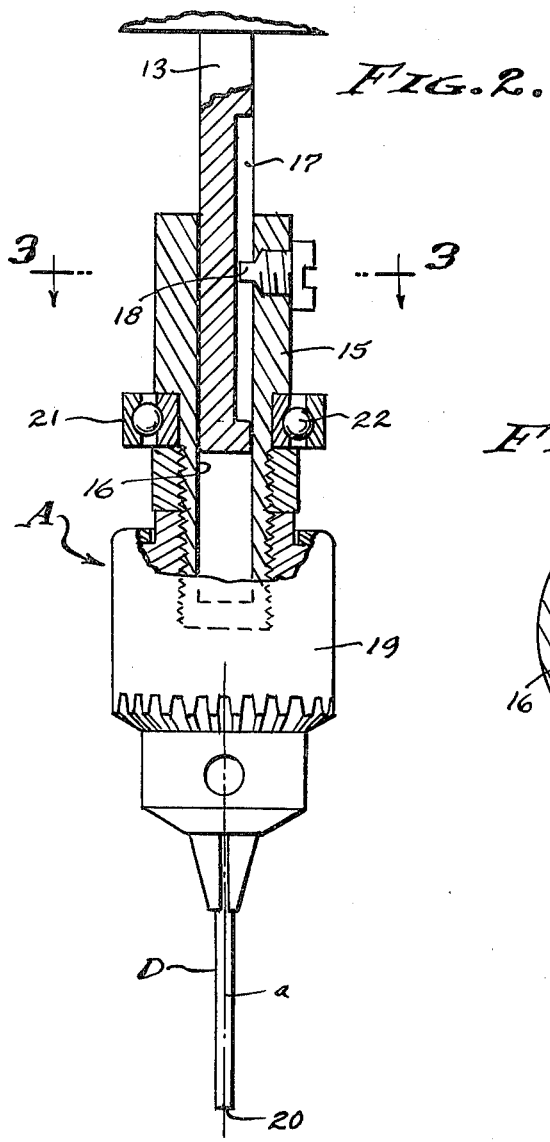
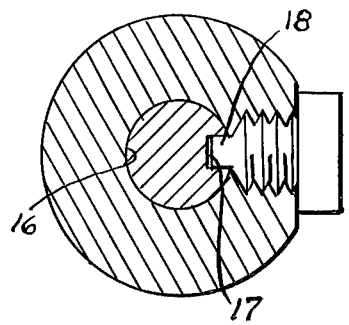
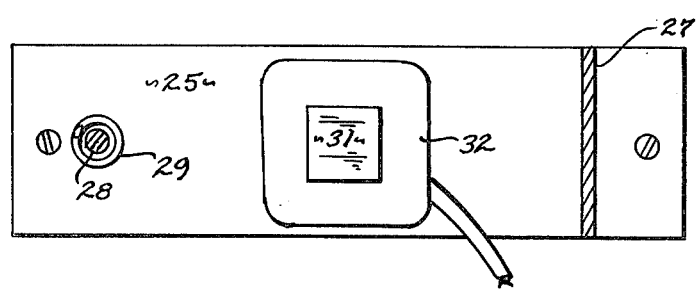

GEMSTONE DRILL

BACKGROUND

Gemstone drilling is by means of the rotary method involving abrasive cutting action utilizing a fine grit or very hard (diamond) drill point. In both cases liquid is used to flush particles and to introduce grit into the cutting zone and to remove cuttings. For example, gemstones are to be drilled with small holes for the passage of threads and/or filaments so as to be strung or fastened, and it has been a tedius task to apply drills in a manner to introduce and remove grit and/or liquid to and from the cutting zone. The prior art method is accomplished manually by continued removal and reapplication of the drill; and the same with considerable complication and expense has been accomplished mechanically. With the present invention it is an object to provide for the drilling of gemstones and the like by means which establishes the flow of cutting grit and/or liquid into the cutting zone intermediate the drill tip and the work piece being drilled.

Heretofore, drills have been lifted and reapplied a countless number of times in order to clear the cutting zone for flushing away old cuttings and to introduce grit for a fresh cutting, there being a wide variation in the frequency of reapplication characterized by manual or mechanical removal of the drill from the cutting zone to be reapplied said countless number of times. With the present invention it is an object to avoid the necessity of removal and reapplication, by permitting the drill to ride upon the cutting zone with a vibratory mounting means maintaining the gemstone in drilling position. In practice, there is a drill assembly the rides by its own weight upon the cutting zone of the gemstone, with vibratory excursions that are vertical and in line with respect to the drilling axis. Therefore, it is an object of this invention to provide mounting means for the vertical excursion of a gemstone into and out of engagement with a rotating drill, and preferably by means of an electrically powered vibrator that oscillates the said mounting means.

It is an object of this invention to provide apparatus of the character referred to that is adaptable to existant drill press construction, and that is equally adaptable to specialized construction as will be described.

It is also an object to provide a magnetic mounting conducive to the versatile application of dams and gemstone securement and for the containment of a liquid wash and/or carrier for the grit utilized in the drilling process, for example an abrasive powder having a grain size of 220 per inch (linear). Accordingly, the aforesaid vibrator is capable of excursions that lift the drill and assembly to clear said grit particles and for circulation thereof throughout the cutting zone. Thus, there is a combined floating drill and dynamic gemstone support which characterizes this invention.

It is still another object of this invention to provide a drill assembly adapted to be depressed by gravity into engagement with a work piece, and manually operable to be lifted out of periodic engagement riding upon the cutting zone as governed by the aforesaid vibrator. With the present invention there is a sliding chuck that is adapted to be lifted on a drive stem that is revolved by motor means. A lift ring is provided for manual retraction while gravity normally feeds the chuck and a drill carried thereby into depressed engagement at the cutting zone.

DRAWINGS

The various objects and features of this invention will be fully understood from the following detailed description of the typical preferred form and application thereof, throughout which description reference is made to the accompanying drawings, in which:

FIG. 2 is an enlarged sectional view taken as indicated by line 2—2 on FIG. 1.

FIG. 3 is an enlarged section taken as indicated by line 3—3 on FIG. 2.

FIG. 4 is a plan section taken as indicated by line 4—4 on FIG. 1.

PREFERRED EMBODIMENT

Figure 1:
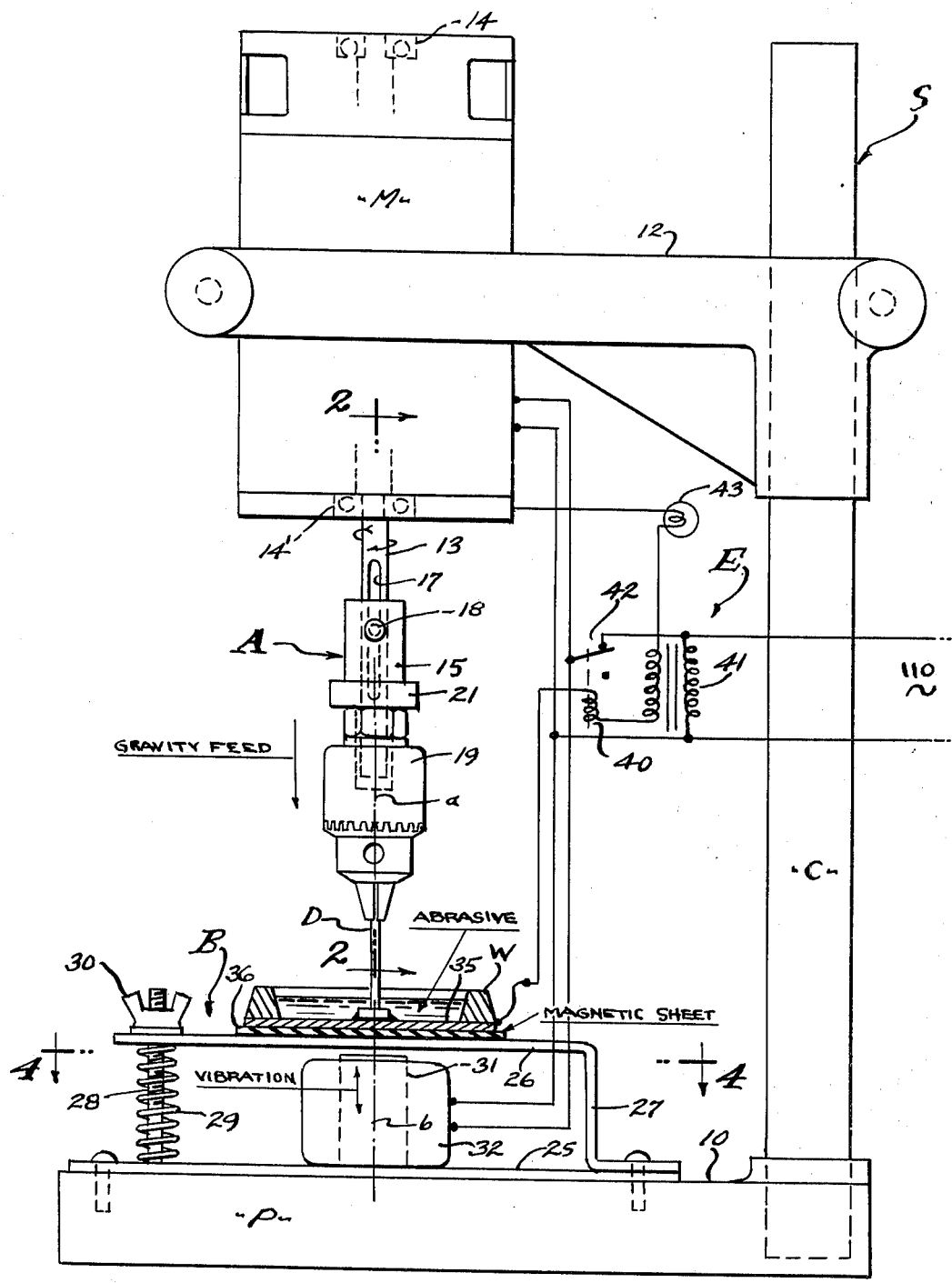
FIG. 1 is a side elevation of a gemstone drilling apparatus comprising the present invention.

This invention relates to the cutting of holes through gemstones and the like utilizing abrasive action, either a grit or a diamond drill and in either case in the presence of a liquid (water) in which the cutting zone is immersed. The liquid provides a carrier for the abrasive grit and cuttings, and the drill is to be periodically lifted or raised so as to provide for flushing of said liquid-grit or cuttings intermediate the drill and the cutting zone on the work piece or gemstone. In practicing this invention, the lift of the drill assembly is commensurate with the abrasive grit size (when grit is used or the cuttings size when diamond drills are used) and at a frequency in the nature of a vibration such as is available from 60 cycle alternating current electrical power. In other words, the vibratory frequency employed is, as a practical matter, applied at a rate determined by the 60 cycle current and in this instance providing 120 excursions per second, since there is an electromagnet attracting a non-polarized mass.

In accordance with this invention I have provided, generally, a depressible drill assembly A in combination with a vibratory support means B, the drill assembly A carrying a drill D to be depressed onto the cutting zone by gravity, and the support means B supporting the work piece or gemstone so as to present the cutting zone thereon and periodically engageable by the drill D to be thrown vertically for grit and/or liquid and cutting clearance over said zone. In carrying out this invention, a conventional drill press can be employed, or alternately a motor driven drill stand S as shown, with the drill assembly A driven by a motor M and the support means B disposed upon a platform P.

Referring now to the stand S, the platform P is a horizontal element having a planar top surface 10 from which a column C projects vertically from the back side. The motor M is carried above the platform and is slideably positioned on the column C by clamp means 12 with its drive axis $a$ vertically disposed and normal to the top surface 10 as shown, the motor shaft or drive stem 13 thereof depends and projects down from the motor M concentric with the axis $a$, accurately determined by anti friction bearings 14 and 14' within the motor construction.

Referring now to the depressible drill assembly A, there is a drive body 15 with a bore 16 therethrough slidable on the stem 13 so as to move axially through a restrictive movement as determined by coupling means, preferably a pin and slot coupling. The coupling rotatably drives the body 15 through rotation of the stem 13, there being a drive slot 17 in the stem engaged by a pin 18 fastened through the side wall of the body 15. In practice, the fastened pin is a dog-point screw fixedly positioned to engage opposite ends of the slot 17, thereby restricting both depression and elevation or retraction of the drill assembly. The lower portion of the body 15 is comprised of a collet or chuck 19 adapted to grip and carry the drill D, clearly indicated as an elongated right cylinder (or tube) with a cutting face 20 at its lowermost terminal end. And, above the chuck there is a lift ring 21 journaled on anti-friction ball bearings 22 or the like so as to be manually engageable to lift the assembly A. A typical drill assembly A weights 5-6 ounces to be acted upon by gravity in order to feed the drill end 20 into riding engagement upon the cutting zone.

Referring now to the vibratory support means B, there is a caliper-shaped body having a fixed arm 25 supported upon the platform surface 10 and a movable arm 26 disposed in a horizontal plane over the arm 25. The arms 25 and 26 are elongated and hingedly attached (integrally) at one end of a leg 27 and the spacing thereof adjustably limited at the other end by screw means 28 or the like. In practice, a compression spring 29 yieldingly separates the movable ends of the arms, with an adjustable nut 30 to limit the height of arm 26. Disposed between the arms 25 and 26 there is a core 31 magnitized on its vertical axis $b$ by a coil or winding 32 in circuit with a 110 volt 60 cycle power supply. The bottom pole of core 31 is affixed to the lowermost arm 25, while the top pole is spaced from or juxtapositioned to the underside of the uppermost arm 26, said spacing being adjustable by the manual setting of a wing-nut (30). It will be apparent that the 60 cycle power applied to coil 32 will cause the periodic attraction of the overlying arm 26 to the core 31, in this instance at 120 excursions per second.

The above described depressible drill assembly A and vibratory lift means B are disposed with their axes $a$ and $b$ substantially coincidental and with the work piece or gemstone G installed for drilling as follows: A utilitarian feature in the replaceable magnetic attachment of a dam or weir W for the containment of liquid and the application of abrasive grit as required. Accordingly, a flat piece 35 is magnetically attached to the top surface of arm 26 by means of a magnetic circuit separate and distinct from the aforesaid vibratory magnetic circuit. In practice, the attachment of plate 35 is by means of a permanently magnetized sheet 36 coextensively disposed beneath the plate 35 and between said plate and arm. The weir W is fashioned of putty or the like and applied onto the upper perimeter of plate 35, while the work piece or gemstone G is secured over the axis $b$ and with the cutting zone thereof aligned with axis $a$ as by means of a cement or any suitable adhesive compound, temporarily or permanently as may be desired.

In accordance with this invention a self limiting control means E is provided to stop or arrest operation of the drill assembly A and vibratory support means B, upon completion of a hole drilled through the gemstone G. In practice, the plate 35 is electrically conductive as well as being magnetic, and the drill D and elements of the assembly A through to the frame of the motor M are also electrically conductive. In the event that the abrasive or liquid carrier is conductive, then the plate is coated with an insulator (not shown) surrounding the gemstone G. Accordingly, I provide a normally open electrical control circuit through a relay coil 40 in series with the low voltage secondary winding of a transformer 41, the series circuit being normally open between plate 35 and the drill D. The relay 42 to be operated by coil 40 is normally closed to a 110 volt A.C. power circuit, across which there is the primary winding of transformer 41, the power circuit being connected to the motor M and coil 32 of means B through the relay 42. Upon completion of a hole through the gemstone G there is electrical continuity when the metallic drill D touches the plate 35, whereby the series control circuit is completed for operation of relay 42 by energizing coil 40 so as to open the power circuit to motor M and vibrator coil 32. In practice a signal lamp 43 can be included in the series control circuit.

From the foregoing it will be apparent that the combined elements hereinabove described can be employed to convert a drill press and/or a portable electrical drill into an apparatus complete for drilling gemstones and capable of both abrasive and diamond drilling. The vibratory support means B is installed upon a drill press without modification and the "floating spindle" drill assembly A is manually liftable as well as periodically liftable by the vibratory excursions hereinabove described. In practice, the vertical excursions of the vibratory support means B enables liquid and abrasive to flow under the terminal end 20 of the drill (tube) throughout the drilling operation. With diamond drills, the vibratory action lifting the drill enables flushing of cuttings from the hole and supplies fresh liquid into the cut. When applying delicate drills and/or tubes it is adviseable to manually lower the rotating drill into engagement with the cutting zone.

Having described only a typical preferred form and application of my invention, I do not wish to be limited or restricted to the specific details herein set forth, but wish to reserve to myself any modifications or variations that may appear to those skilled in the art.

I claim:

1. In combination, a platform with a stand projecting vertically therefrom, an abrasive drill assembly carried by the stand and depressible by gravity on a vertically disposed rotational cutting axis into engagement with a work piece cutting zone, and a vibrating support means carried by the platform and supporting the work piece for vertical excursions in alignment with said cutting axis and periodically engaging the said depressible abrasive drill assembly, said vibrating support means comprising a caliper-shaped body fixed to said platform by a lower arm thereof and with an upper arm thereof carrying the work piece underlying said cutting zone, there being spring means lifting the said upper arm and adjustment means restricting lifting thereof, whereby the vibratory lift means alternately lifts and supports the work piece and the drill assembly engaged thereon by means of excursions aligned with the rotational axis.

2. The drill assembly and lift means combination as set forth in claim 1, wherein the spring means lifting said upper arm of the vibrating support means is a compression spring yieldingly separating the said lower and upper arm, and wherein the adjustment means is a nut threadedly positioned on a screw to engage one of said arms to position it relative to the other.

3. In a combination, a platform with a stand projecting vertically therefrom, an abrasive drill assembly carried by the stand and depressible by gravity on a vertically disposed rotational cutting axis into engagement with a work piece cutting zone, and a vibratory support means carried by the platform and comprising an electromagnet with a vertically disposed core and alternately powered with current and with a caliper-shaped body having an arm movable vertically with respect to said core and supporting the work piece thereon with the cutting zone thereof aligned with said rotational cutting axis and periodically engaging the said depressible abrasive drill assembly, the vibratory lift means alternately lifting and supporting the work piece by means of vertical vibratory excursions aligned with the said drill assembly the work piece being secured to a mounting plate magnetically attached to said moveable arm of the caliper-shaped body, there being a surrounding dam at the periphery of the said mounting plate and containing abrasive liquid throughout the cutting zone immersed therein.

4. The drill assembly and lift means combination as set forth in claim 3, wherein an electrical control circuit is imposed in series through the drill assembly and said mounting plate, respectively, to indicate completion of a hole drilled through the work piece by means of establishing efficient electrical continuity when the drill touches the plate.

5. The drill assembly and lift means combination as set forth in claim 3, wherein the drill assembly and said electromagnet of the vibratory lift means are electrically energized through a normally closed relay in a power circuit thereto, and wherein an electrical control circuit is imposed in series through the drill assembly and said mounting plate, respectively, to open said relay when a hole is drilled through the work piece by means of establishing efficient electrical continuity when the drill touches the plate.

* * * * *